United States Patent [19]

Haberland

[11] 4,261,211

[45] Apr. 14, 1981

[54] FLEXURE JOINT, PARTICULARLY FOR CONNECTING A GYROSCOPE TO ITS DRIVING SHAFT

[75] Inventor: Rüdiger Haberland, Kiel, Fed. Rep. of Germany

[73] Assignee: Anschutz & Co. G.m.b.H., Fed. Rep. of Germany

[21] Appl. No.: 18,226

[22] Filed: Mar. 7, 1979

Related U.S. Application Data

[63] Continuation of Ser. No. 851,172, Nov. 14, 1977, abandoned.

[30] Foreign Application Priority Data

Nov. 24, 1976 [DE] Fed. Rep. of Germany ....... 2653427

[51] Int. Cl.³ .............................................. G01C 19/22
[52] U.S. Cl. ..................................... 74/5 F; 267/160; 308/2 A
[58] Field of Search ......................... 74/5 F; 308/2 A; 267/160; 248/586, 618, 622, 626; 64/15 B, 27 B, 27 L

[56] References Cited

U.S. PATENT DOCUMENTS

| 96,213 | 10/1869 | English et al. | 248/626 X |
|---|---|---|---|
| 2,238,380 | 4/1941 | Almen | 267/57 |
| 2,606,447 | 8/1952 | Boltinghouse | 74/5 F |
| 2,797,580 | 7/1957 | Taylor | 74/5 F |
| 2,909,064 | 10/1959 | Schoeppel et al. | 74/5 F |
| 2,984,996 | 5/1961 | Ormond | 267/160 X |
| 2,992,047 | 7/1961 | Ecker | 267/160 X |
| 3,036,469 | 5/1962 | Giovanni | 267/160 X |
| 3,102,721 | 9/1963 | Linville | 267/160 |
| 3,264,880 | 8/1966 | Fischel | 74/5 F |
| 3,575,475 | 4/1971 | Boerner | 308/2 A |
| 3,700,289 | 10/1972 | Bilinski et al. | 74/5 F X |

FOREIGN PATENT DOCUMENTS

| 779609 | 3/1968 | Canada | 248/618 |
|---|---|---|---|
| 1445653 | 8/1976 | United Kingdom . | |

*Primary Examiner*—Rodney H. Bonck
*Attorney, Agent, or Firm*—Shlesinger, Fitzsimmons & Shlesinger

[57] ABSTRACT

The flexure joint for connecting two members for relative angular displacement comprises a pair of flexure leaves which merge with the members at their ends and cross each other and are rigidly connected with each other at the crossing point. Relative angular displacement of the members results in a flexure of the leaves. The flexure universal joint for connecting a gyroscope to its driving member comprises a Cardan member hinged by a pair of co-axial spaced flexure joints of the kind described hereinabove for relative angular displacement about a first hinge axis to the driving member and hinged by a second pair of co-axial spaced flexure joints of the same type to the gyroscope member for relative angular displacement about a second hinge axis, which intersects the axis of rotation of said gyroscope at right angles, said first hinge axis intersecting said second hinge axis and the axis of rotation of said driving member at right angles.

7 Claims, 11 Drawing Figures

FLEXURE JOINT, PARTICULARLY FOR CONNECTING A GYROSCOPE TO ITS DRIVING SHAFT

This is a continuation of application Ser. No. 851,172, filed Nov. 14, 1977, and now abandoned.

1. Field of the Invention

This invention relates to improvements in a flexure joint for connecting a pair of members for relative angular displacement about a hinge axis, the joint comprising a pair of leaf springs which cross each other and merge at their ends with the members. More particularly, the present invention relates to a universal joint for connecting a gyroscope to its drive shaft in such a manner that the axis of rotation of the gyroscope is free to tilt relative to the axis of the driving shaft in all directions, such universal joint comprising a Cardan member hinged to the gyroscope for relative angular displacement about a first axis and hinged to a driving member, such as the shaft, for relative angular displacement about a second axis, said first axis intersecting at right angles the axis of rotation of the gyroscope and the second axis, each of the two hinges comprising a pair of spaced flexure joints of the type described hereinabove.

2. Description of the Prior Art

U.S. Pat. No. 3,575,475 discloses a universal flexure joint for connecting a gyroscope to its driving shaft in such a manner that the gyroscope rotor while rotating in unison with the shaft is free to tilt transversely to the driving shaft in any direction. This universal joint comprises an annular Cardan member hinged to the gyroscope by a pair of spaced flexure joints for relative angular displacement about a first hinge axis and hinged to an annular driving member rigidly and co-axially connected to the driving shaft by a second pair of spaced flexure joints for relative angular displacement about a second hinge axis which intersects the first hinge axis and the axis of the driving member at right angles, each of the flexure joints comprising a pair of crossing flexure leaves which at their ends merge with the relatively tiltable members. These flexure leaves crossing each other are not connected together but are separated from each other at the crossing point. As a result, the hinge axis of each flexure joint is subject to displacement relative to the members connected by the flexure leaves when the same are bent by a relative angular displacement of the members.

OBJECTS OF THE INVENTION

It is an object of the invention to so design the flexure joint and the universal joint including flexure joints of the kind described hereinabove that the hinge axis will remain in the same position relative to the members pivotally connected thereby when such members are relatively angularly displaced. It is another object of our invention to so design the flexure joint that a high flexibility about the hinge axis will not adversely affect the stiffness of the flexure joint with respect to any torques acting on the joined members about axes extending at an angle to the hinge axis. In other words, the hinge formed by the leaf springs between the members shall strongly resist any relative displacement of the members except the angular displacement about the hinge axis. More particularly it is an object of the invention to so design the flexure joint formed by leaf springs crossing each other that these leaf springs may be made quite thin and will yet strongly resist any relative displacement of the members except the angular displacement about the hinge axis.

The above objects have been attained according to the invention by a rigid connection of the flexure leaves with each other at the crossing point.

In a preferred embodiment of my invention the following elements are combined with each other:

A first member, a second member, a pair of substantially straight flexure leaves extending between said members and having two end sections and a mid-section therebetween, one of said end sections of each leaf being integral with said first member and the other one of said end sections of the same leaf being integral with said second member, said leaves extending at an angle to and crossing each other, said leaves having a common transverse axis, said mid-sections being rigidly connected with each other at said transverse axis, whereby said leaves guide said members for a relative angular displacement about said axis which displacement results in a flexure of said leaves.

A flexure joint of this kind constitutes a hinge between the first member and the second member which strongly resists any relative displacement of the members except the angular displacement about said common transverse axis.

BRIEF DESCRIPTION OF THE DRAWINGS

In the drawings preferred embodiments of the invention are illustrated.

FIG. 1 shows two members 20 and 22 which are hinged to each other by the novel flexure joint so as to pivot about an axis of articulation 24. The flexure joint consists of crossed leaf springs or flexure leaves 26 and 28 which are connected rigidly together at the point of crossing, i.e., on the axis 24. In the relaxed state the two leaf springs 26 and 28, which cross at an angle of 90°, assume the position shown in broken lines. If the member 20 tilts to the position shown in solid lines, while member 22 remains in the same position, the leaf springs bend and assume a position shown on an exaggerated scale in solid lines. Since the leaf springs are connected rigidly together at the crossing point, they maintain their angle of crossing of 90° at the transverse axis 24. This axis extends at right angles to the plane of the drawing.

Figure 1:
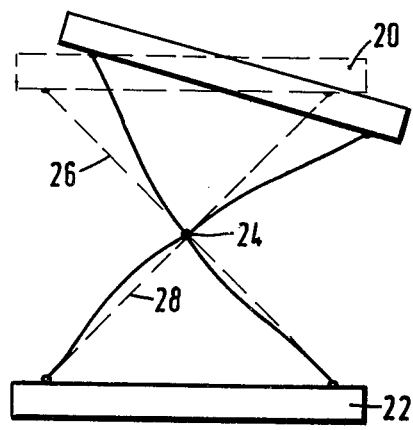
FIG. 1 is a schematic side-view of a resilient joint or flexure joint according to the invention.

At their ends the two leaf springs 26 and 28 merge with the members 20 and 22 as their end sections are integral with these members. This may for example be achieved by welding them on at these points. It is also possible for the springs to be in one piece with the bodies. The configuration which then commends itself for the resilient joint is that shown in FIG. 2. To produce this embodiment, a single square body is provided, by electrical erosion, with four parallel passageways, A, B, C and D, each of which is adjacent to two of the other passageways and traverses the square body from one side face S to the parallel opposing side face S1, with passageway C for example being adjacent to two other passages B and D. The passages are of substantially triangular cross-section and separated from each other by relatively thin walls which form the leaf springs 26 and 28. The square block is split up into two bodies 34 and 36 by slots 30 and 32. In the case of both the embodiments shown in FIGS. 1 and 2, each leaf spring 26 or 28 is bounded by two equidistant faces. Where the two leaf springs cross, they are connected rigidly together. In the case of the embodiment in FIG. 2 they are formed from a single part. The angle at which they cross is 90°.

Figure 2:
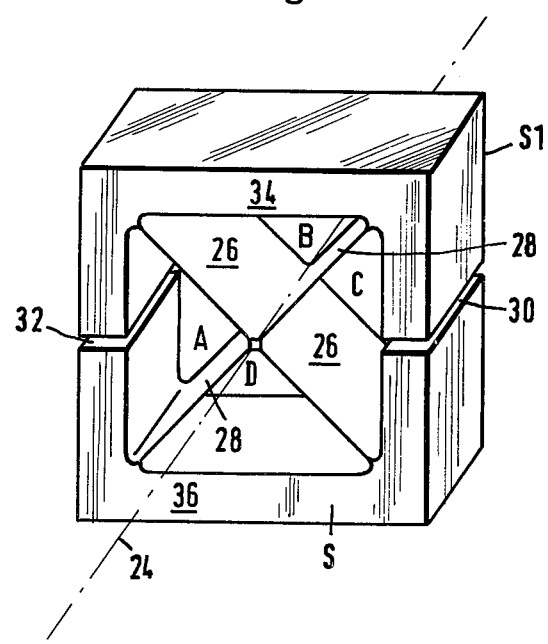
FIG. 2 is a schematic view of another form of a resilient joint according to the invention.

As will appear from FIG. 2, each leaf is composed of two end sections, one end section merging into the member S and the other end section merging into the member S1. The midsection extending between such end sections is itself composed by a pair of semi-sections, each semi-section extending between the axis 24 and an end section. Therefore, each of the four passageways A, B, C and D is confined by a pair of the semi-sections of the leaves and by an internal wall of the body.

The advantage of the new flexure joint according to the invention resides in the fact that the axis of articulation 24 always lies on the crossing point of the springs, even where displaced by their deflection, i.e., this axis lies at a point which remains in the same position relative to both of the two bodies 20, 22 or 34, 36. If however, as is the case with the prior art referred to above, the two leaf springs were to pass by one another without being connected, this position would alter as the displacement of the axis increases.

A further advantage of the new joint is the fact that the required dimensions of the two bodies in the direction of the axis of articulation 24 are halved in comparison with the prior art referred to above, where at least two springs of the width required to support the axial load have to be arranged one behind the other viewed in the direction of axis 24. Another advantage is the high load-bearing capacity in directions transverse to the axis 24 resulting from the fact that the rigid attachment of the leaf springs to one another increases their buckling strength. For springs whose side faces are equidistant, the buckling strength can now be approximately double.

The new resilient joint is of course stiffer as compared with a resilient joint in which the two leaf springs extend past one another in the known way instead of being connected together at the crossing point. This stiffness can be reduced to the requisite level by selecting a suitable configuration for the springs and in particular by making them thin.

The manufacture of the new joint is considerably simplified by the fact that four passages A, B, C and D may be made very short measured in the direction of the axis of articulation and will be at least much shorter than would be the case if the two leaf springs were to extend past one another without being secured together.

Instead of using the electrical spark erosion technique, the passages may be formed by electrochemical excavation, contoured grinding or by other methods.

The application of the invention to a universal joint for connecting a gyro rotor to its drive shaft will now be explained with reference to FIGS. 3, 4 and 5. The universal joint in this case consists of a hollow cylindrical body having two parallel end-faces 70 and 72 which is divided into three co-axial members by slots which open onto the circumferential face. A member 74 which is rigidly secured to the gyro rotor in co-axial relationship has the end-face 70. Another member 76 which is rigidly secured to the gyro drive shaft in co-axial relationship has the end-face 72. Between the two members 74 and 76 lies a third member 78, the "spider" or Cardan member. The member 78 is hinged to the member 76 in such a way as to pivot about a first hinge axis 82 of the universal joint and is hinged to member 74 in such a way as to pivot about a second hinge axis 84. The two hinge axes 82 and 84 extend diametrically and intersect perpendicularly to each other. Axis 80 of the cylindrical structure passes through the point of intersection of the axes 82 and 84 and is perpendicular to the plane defined by the axes 82 and 84. Each hinge comprises a pair of spaced co-axial flexure joints of the type shown in FIG. 1.

One such pair lies on hinge axis 82. The other pair lies on hinge axis 84. Hence it will appear that the three members 74, 76 and 78 are connected together by the four pairs of leaf springs only, otherwise they are completely separated from one another by the slots already mentioned. These are the slots 86 and 88 which extend parallel to the end-faces 70 and 72, the straight slots 90 and 92 which extend parallel to axis 80 and axes 84 and 82 respectively, and further slots 94 which also extend parallel to the end-faces 70 and 72. The slots open into the passageways which are parallel to the axes 82 and 84 and define the pairs of leaf springs.

Figure 3:
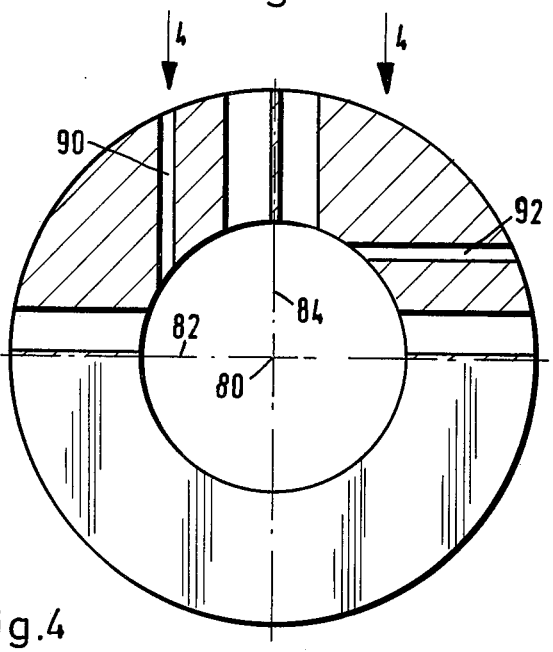
FIG. 3 shows a three-part resilient universal joint for driving the rotor of a gyro, partly in elevation looking in the direction of the arrows III in FIG. 4 and partly in section along the plane 3—3 in FIG. 4, the universal joint incorporating flexure joints according to the invention.
Figure 4:
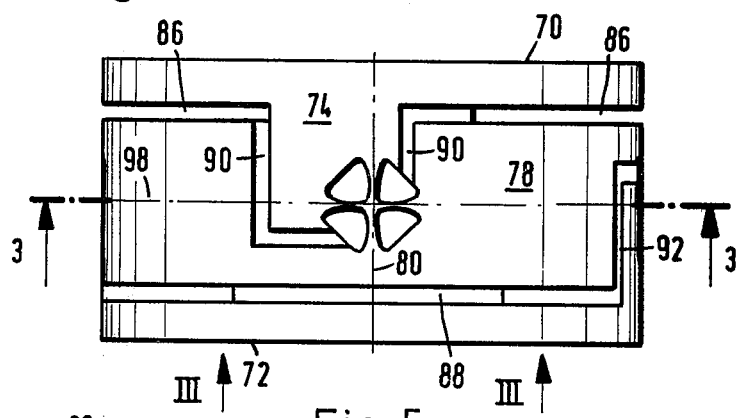
FIG. 4 shows the universal joint of FIG. 3, looking in the direction of the arrows 4.
Figure 5:
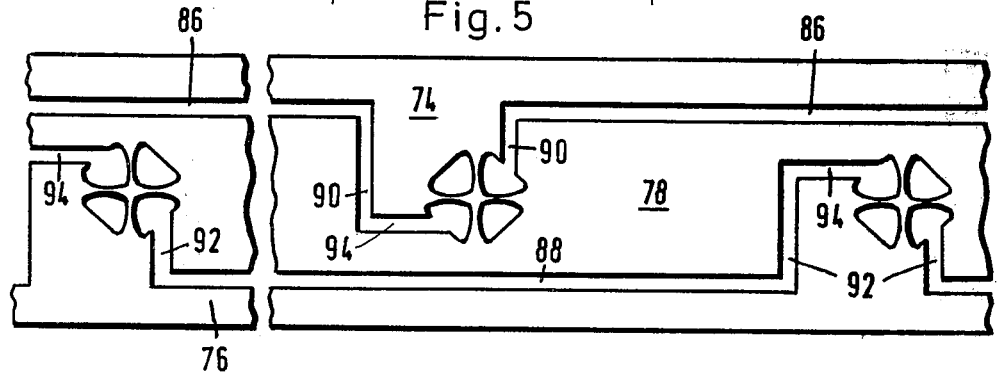
FIG. 5 is a developed view of the circumferential surface of the universal joint shown in FIGS. 3 and 4.

The structure shown in FIGS. 3 to 5 also differs substantially from the universal coupling of the prior art in respect of the outline of the passageways defining the leaf springs. Whereas in the case of the prior art these passages are of circular cross-section, in the present case they are of the form which has been explained with reference to FIG. 2.

A feature which corresponds to the prior art is that one half of the number of leaf springs lie in the plane containing the axes 82, 84 and the other half in a plane perpendicular to this plane.

Figure 6:
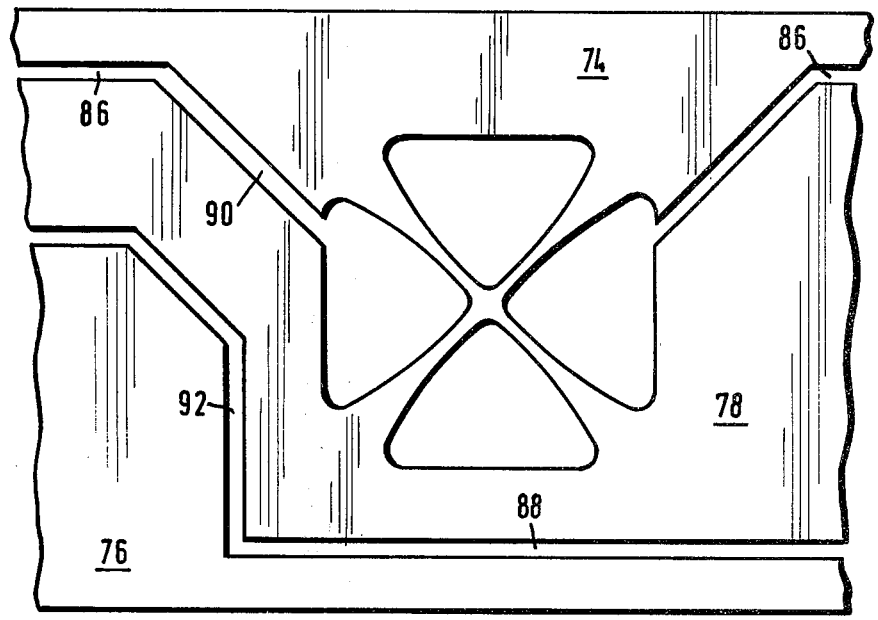
FIG. 6 is a developed view, corresponding to the central portion of FIG. 5, of the circumference of a resilient universal joint which differs from that shown in FIGS. 3 to 5 by virtue of the angular position of the leaf springs of its flexure joints.

It is of considerable advantage for the individual leaf springs to form the same angle, e.g., an angle of 45°, with plane 98 (FIG. 4) containing the two axes 82 and 84. An embodiment of this arrangement which is thereby produced is shown in FIG. 6, which corresponds to the centre portion of FIG. 5. This arrangement of the leaf springs enables favorable symmetry conditions to be obtained.

When applied to dirving a gyro motor, the member 78 forms as stated before the "spider" which is hinged to the member 76 by two aligned leaf spring joints, and is hinged to the member 74, by the other two aligned leaf spring joints, the gyro rotor thus being able to tilt in all directions relative to the gyro shaft and being coupled to it for joint rotation.

Figure 7:
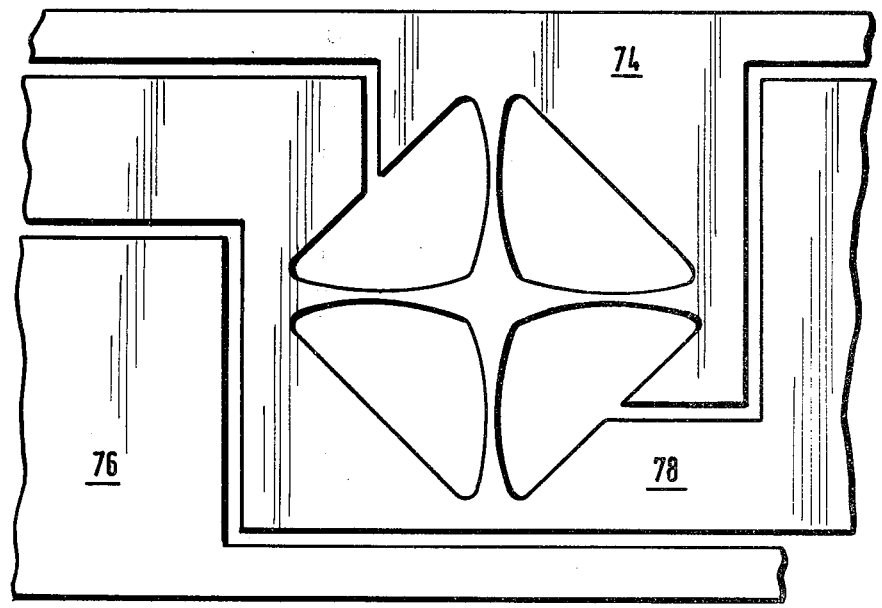
FIG. 7 is a view corresponding to FIG. 6 of a universal joint in which the springs occupy the angular position of FIGS. 4 and 5.

The embodiment of FIGS. 3 to 5 is shown again in FIG. 7, but at a larger scale.

Figure 8:
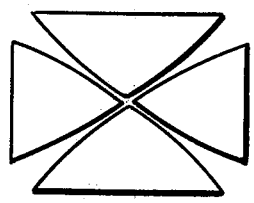
FIG. 8 is a broken-away view of a joint in which the angle of intersection of the leaf springs is other than 90°.

Whereas in the case of the embodiments already described the leaf springs cross each other at right angles, it is also possible for configuration of the passages in outline to be such that the crossing angle of the two leaf springs is other than 90° (FIG. 8).

Thus, the universal joint described with reference to FIGS. 3 to 5 has four pairs of crossed leaf springs, with each pair defined by four parallel passageways (E, F, G, H) traversing the hollow cylindrical body from its outer to its inner circumferential face. These four passages correspond to those marked A, B, C and D in FIG. 2.

Various possible ways of forming these passages are offered by modern spark erosion techniques. Thus, the erosion may for example be performed using a tensioned wire which is led through a bore in the annular body extending parallel to a hinge axis and which is caused to follow a path which corresponds to the desired outline of a passage. This wire then cuts a core out of the hollow cylindrical structure, the core being thereupon removed leaving a passage behind.

It is likewise possible to erode, from a radial bore, only the two faces which form a spring, with the result that the passage is in the form of a curved gap and no core has to be removed.

Two pairs of crossed leaf springs are provided along each of the two hinge axes 82 and 84 in FIG. 3, with each being defined by a group of four passages E, F, G and H around each of the axes, the four passages forming a group are exactly aligned with the four passages forming the other group around the same axis. Thus, if the length of the erosion wire is made greater than the outside diameter of the hollow cylindrical structure formed by the bodies 74, 76 and 78, then the wire can be passed through the entire structure parallel to the hinge axis 82 or 84. If, during the erosion operation, the wire is then fed along a path corresponding to a substantially triangular outline of a passage, it cuts out two aligned cores. If for example the wire extends parallel to axis 82, then one core is situated to the right of axis 84 in FIG. 3 and the other to the left. The passages which remain when the cores are taken out are then exactly aligned with one another. This considerably simplifies manufacture.

Figure 11:
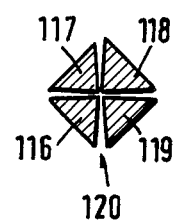
FIG. 11 is a broken-off section along line 11—11 of FIGS. 9 and 10.
Figure 9:
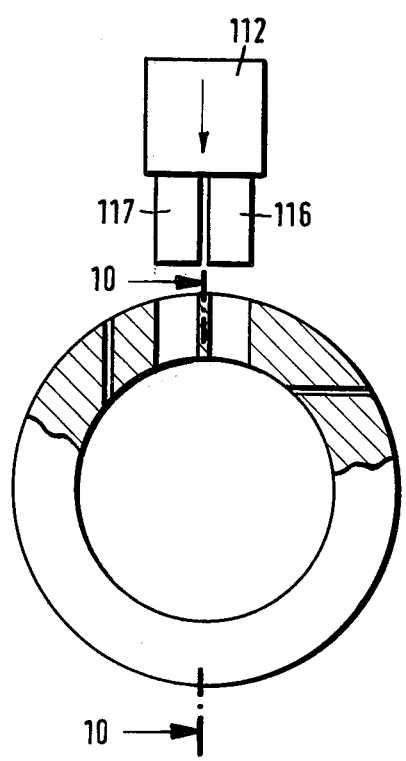
FIG. 9 is a view similar to FIG. 3 of a three-part resilient universal joint together with the tools for the removal of material by the use of electrical energy, looking in the direction of the arrows 9 in FIG. 10, the universal joint incorporating flexure joints according to the invention.
Figure 10:
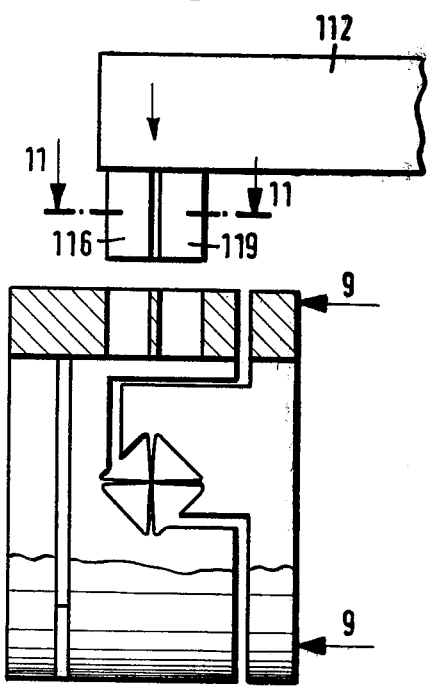
FIG. 10 is a side-view of the universal joint shown in FIG. 9 and the tools, partly in section along line 10—10 of FIG. 9.

Another possibility offered by the erosion technique is the use of the electrodes illustrated in FIGS. 9 to 11 for producing the passageways in the resilient universal joint coupling shown in FIGS. 3 to 5. In this case a single electrode 112 is used to produce simultaneously the four passageways defining an individual pair of crossed leaf springs. The electrode consists of a conductive bar which has near its end four parallel prismatic spigots 116, 117, 118 and 119 of equal length projecting from a lateral surface of the bar. Their length is greater than the thickness of the wall of the hollow cylinder which forms member 78, i.e., the distance between its outer circumferential face and its inner circumferential face. In FIG. 11 adjacent side faces of the spigots 116 to 119 extend at right angles to the sideface of the bar 112. The cross-sectional outline of the spigots 116 to 119 can be seen in FIG. 11. The shape of this outline is such that the outline in cross-section of the space 120 between two adjacent spigots is the same as the desired outline in longitudinal section of a leaf spring.

To carry out the erosion operation, the electrode 112 is brought to the position shown in FIGS. 9 and 10, in which the planes containing the axes 82 and 84 pass between the spigots 116 to 119. The electrode 112 is then advanced in the radial direction relative to the member 78 through a conductive liquid, a circuit then being closed by the electrode and spigots. The spigots 116 to 119 penetrate into the work-piece from the exterior and as they do so they form passages which between them leave only the material for the crossed leaf springs standing. When the electrode 112 has been withdrawn radially to the starting position shown in FIGS. 9 and 10 a pair of leaf springs is complete. The workpiece is then moved through 90° about its axis 80 relative to the electrode 112, after which the next pair of crossed leaf springs is formed in the same way. When all four pairs of crossed leaf springs have been formed the workpiece from which the coupling is made is fully processed. In the case of the embodiment of FIG. 6 the positions of the passages E to H alter accordingly.

The method of manufacture described ensures that the planes of the springs situated on the same axis of articulation are exactly in line. This avoids added stiffness in a resilient joint which may otherwise occur if opposite groups of four passages were skewed or misaligned.

In the foregoing the construction and operation of the illustrated exemplary embodiments of the invention have been described in considerable detail in order to ensure a complete understanding of the invention. However, it is to be understood that the invention is not limited to the particular application or to the details of construction of the illustrated embodiments and I desire to cover by the appended claims such other applications and modifications as do not depart from the true spirit and scope of my invention.

What I claim is:

1. A flexure joint for pivotally connecting a pair of rigid bodies with each other, said joint comprising
    a first spring leaf extending between said bodies and having its ends rigidly merged therewith at a first merger point on each body,
    a second spring leaf extending between said bodies, crossing said first spring leaf, and having its ends rigidly merged with said bodies at second merger points spaced an invariable distance on each body from said first merger point thereon, and
    said spring leaves being rigidly connected to each other at the crossing point of said leaves so as to form a pivot axis extending through said crossing point transversely to said spring leaves.

2. A flexure joint, comprising
    a first member,
    a second member, spaced from said first member, and
    a pair of substantially straight, intersecting flexure leaves fixed to and extending between said members, and supporting said members for relative pivotal displacement about a hinge axis located between and spaced from said members, each of said leaves having a midsection intersecting the midsection of the other leaf at an angle, and being rigidly fixed thereto along a transverse axis which coincides with said hinge axis, and having opposed end sections extending in opposite directions beyond its midsection substantially radially of said hinge axis, and one of the two end sections of each leaf being fixed to each of said members at spaced points thereon, and each of said members being operative to maintain a fixed distance between the two points where it is fixed to said leaves, whereby said pivotal displacement will produce in the leaves bending moment stresses about said hinge axis, rather than torsional stresses about said axis.

3. A flexure joint as claimed in claim 2 in which said members and said leaves are integral with each other.

4. A flexure joint as claimed in claim 2 in which said angle amounts to 90°.

5. In a flexure Cardan joint the combination comprising a driving member for rigid connection to a rotary driving shaft, a Cardan member, a first pair of spaced co-axial flexure joints for pivotally connecting said Cardan member to said driving member for common rotation therewith and for relative pivotal displacement about a first hinge axis intersecting the axis of said driving shaft at right angles, a driven member, and a second pair of spaced co-axial flexure joints for connecting said driven member to said Cardan member for common rotation therewith and for relative pivotal displacement about a second hinge axis intersecting the axis of said driving shaft and said first hinge axis at right angles, each of said joints comprising a pair of leaves, each leaf having (a) a transverse axis coinciding with said respective hinge axis, (b) two end sections fixed to said respective members and spaced from said hinge axis and (c) a mid-section, the mid section of one of said leaves of each pair being rigidly connected with the midsection of the other one of said leaves of said last mentioned pair at said transverse axis, said leaves of each pair extending at an angle to and intersecting each other, whereby said pivotal displacement will produce bending stresses in said leaves as distinguished from torsional stresses.

6. The combination claimed in claim 5 in which said members and said straight flexure leaves constitute a single integral body having slots between said members and having an internal cavity located between said co-axial flexure joints and communicating with said slots.

7. The combination claimed in claim 6 in which each flexure leaf is composed of a pair of integral semi-sections, each semi-section comprising one of said end sections and half of said midsection, said body being provided with sets of parallel passageways, the passageways of each set extending through said body along one of said axes from said internal cavity to the outside of said body and being separated from each other by said leaves, each passageway being confined by a pair of said semi-sections and by an internal wall of said body.

* * * * *